United States Patent
Rozint et al.

(10) Patent No.: US 11,640,587 B2
(45) Date of Patent: May 2, 2023

(54) VEHICLE REPAIR WORKFLOW AUTOMATION WITH OEM REPAIR PROCEDURE VERIFICATION

(71) Applicant: Mitchell International, Inc., San Diego, CA (US)

(72) Inventors: John Joseph Rozint, San Diego, CA (US); Kien Nguyen, San Diego, CA (US); Thomas Butch, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 0 days.

(21) Appl. No.: 17/023,251

(22) Filed: Sep. 16, 2020

(65) Prior Publication Data

US 2021/0097503 A1    Apr. 1, 2021

Related U.S. Application Data

(60) Provisional application No. 62/908,385, filed on Sep. 30, 2019.

(51) Int. Cl.
*G06Q 10/20*    (2023.01)
*G06F 16/90*    (2019.01)
*G06Q 10/0631*    (2023.01)

(52) U.S. Cl.
CPC ............ *G06Q 10/20* (2013.01); *G06F 16/90* (2019.01); *G06Q 10/06316* (2013.01)

(58) Field of Classification Search
CPC ... G06Q 10/20; G06Q 10/06316; G06F 16/90
(Continued)

(56) References Cited

U.S. PATENT DOCUMENTS 7,502,772 B2    3/2009    Kidd et al.
7,698,086 B2    4/2010    Kidd et al.
(Continued)

OTHER PUBLICATIONS

Daniewski et al. "Analysis of the correctness of determination of the effectiveness of maintenance service actions." Management and Production Engineering Review 9 (2018). (Year: 2018).*
(Continued)

*Primary Examiner* — Sarah M Monfeldt
*Assistant Examiner* — John S. Wasaff
(74) *Attorney, Agent, or Firm* — Sheppard Mullin Richter & Hampton LLP

(57) ABSTRACT

A computer-implemented method comprising: obtaining repair estimate data that describes a repair estimate for a damaged vehicle; extracting, from an OEM repair procedure database according to the received repair estimate data, repair procedure data that describes repair procedures for the damaged vehicle; transmitting the extracted repair procedure data to at least one technician computing device; obtaining repair log data generated by the at least one technician computing device, wherein the repair log data describes one or more repairs performed upon the damaged vehicle; determining whether the repair procedures for the damaged vehicle have been satisfactorily performed based on the received repair log data and the extracted repair procedure data; sending an electronic approval message responsive to determining the repair procedures for the damaged vehicle have been satisfactorily performed; and sending an electronic disapproval message responsive to determining the repair procedures for the damaged vehicle have not been satisfactorily performed.

27 Claims, 4 Drawing Sheets

(58) Field of Classification Search
USPC .......................................................... 705/305
See application file for complete search history.

(56) References Cited

U.S. PATENT DOCUMENTS

| | | | |
|---|---|---|---|
| 8,019,629 B1 | 9/2011 | Medina, III et al. | |
| 8,160,904 B1 | 4/2012 | Smith | |
| 8,260,639 B1 | 9/2012 | Medina, III et al. | |
| 8,712,806 B1 | 4/2014 | Medina, III et al. | |
| 9,218,626 B1 | 12/2015 | Haller, Jr. et al. | |
| 9,721,400 B1 | 8/2017 | Oakes, III et al. | |
| 9,846,093 B2 | 12/2017 | Smith | |
| 10,282,788 B1* | 5/2019 | Jordan, II | G06Q 30/01 |
| 10,319,035 B2 | 6/2019 | Nelson et al. | |
| 10,339,728 B1 | 7/2019 | Oakes, III et al. | |
| 10,410,439 B1 | 10/2019 | Gingrich et al. | |
| 10,510,142 B1 | 12/2019 | Dohner et al. | |
| 10,657,707 B1* | 5/2020 | Leise | G06T 17/00 |
| 10,922,726 B1 | 2/2021 | Nelson et al. | |
| 10,949,814 B1 | 3/2021 | Nelson et al. | |
| 2002/0111846 A1* | 8/2002 | Singer | G06Q 10/109 |
| | | | 705/305 |
| 2004/0111313 A1* | 6/2004 | Ingman | G06Q 10/1097 |
| | | | 705/7.16 |
| 2004/0199805 A1* | 10/2004 | Yasunaga | G06Q 10/109 |
| | | | 714/2 |
| 2006/0064393 A1* | 3/2006 | Orr | G06Q 10/10 |
| | | | 705/400 |
| 2007/0179868 A1* | 8/2007 | Bozym | G06Q 30/0601 |
| | | | 705/26.1 |
| 2014/0058764 A1* | 2/2014 | Vahidi | G06Q 10/10 |
| | | | 705/4 |
| 2014/0122130 A1 | 8/2014 | Kelly et al. | |
| 2015/0127505 A1* | 5/2015 | Parikh | G06T 3/60 |
| | | | 705/35 |
| 2016/0104128 A1* | 4/2016 | Gosselin | G06Q 10/20 |
| | | | 705/305 |
| 2016/0178465 A1 | 6/2016 | Smith et al. | |
| 2016/0196701 A1* | 7/2016 | Strother | G06Q 10/06 |
| | | | 701/29.3 |
| 2017/0221110 A1* | 8/2017 | Sullivan | G06Q 30/0278 |
| 2017/0301154 A1* | 10/2017 | Rozint | G07C 5/085 |
| 2017/0308839 A1* | 10/2017 | Bonham | G06Q 10/20 |
| 2018/0247277 A1* | 8/2018 | Livernois | G06Q 10/20 |
| 2018/0300576 A1 | 10/2018 | Dalyac et al. | |
| 2019/0122047 A1* | 4/2019 | Uemura | H04N 5/77 |
| 2019/0156299 A1* | 5/2019 | Hosokawa | G06Q 10/20 |
| 2019/0164360 A1* | 5/2019 | Pursifull | G07C 5/006 |
| 2020/0057434 A1* | 2/2020 | Koshak | G05B 23/0227 |
| 2020/0159200 A1* | 5/2020 | Hoashi | G06Q 10/00 |
| 2021/0192472 A1* | 6/2021 | Yamashita | G09G 5/006 |
| 2021/0192638 A1* | 6/2021 | Cook | G06Q 40/08 |
| 2022/0019748 A1* | 1/2022 | Krenz | G06F 40/10 |

OTHER PUBLICATIONS

Singh, R., Ayyar, M. P., Pavan, T. V. S., Gosain, S., & Shah, R. R. (Sep. 2019). Automating car insurance claims using deep learning techniques. In 2019 IEEE Fifth International Conference on Multimedia Big Data (BigMM) (pp. 199-207). IEEE. (Year: 2019).*

* cited by examiner

VEHICLE REPAIR WORKFLOW AUTOMATION WITH OEM REPAIR PROCEDURE VERIFICATION

CROSS REFERENCE TO RELATED APPLICATIONS

The present application claims priority to U.S. Provisional Patent Application No. 62/908,385, filed Sep. 30, 2019, entitled "Methods For Providing Repair Procedures For Automotive Collision Repairs And Devices Thereof," the disclosure thereof incorporated by reference herein in its entirety.

DESCRIPTION OF RELATED ART

The disclosed technology relates generally to systems for vehicle repair workflows, and more particularly, some embodiments relate to automation of those workflows.

SUMMARY

A claimed solution rooted in computer technology overcomes problems specifically arising in the realm of computer technology.

In general, one aspect disclosed features a system, comprising: a hardware processor; and a non-transitory machine-readable storage medium encoded with instructions executable by the hardware processor to perform a method comprising: obtaining repair estimate data, wherein the repair estimate data describes a repair estimate for a damaged vehicle; extracting repair procedure data from an original equipment manufacturer (OEM) repair procedure database according to the received repair estimate data, wherein the extracted repair procedure data describes repair procedures for the damaged vehicle; transmitting the extracted repair procedure data to at least one technician computing device; obtaining repair log data generated by the at least one technician computing device, wherein the repair log data describes one or more repairs performed upon the damaged vehicle; determining whether the repair procedures for the damaged vehicle have been satisfactorily performed based on the received repair log data and the extracted repair procedure data; sending an electronic approval message responsive to determining the repair procedures for the damaged vehicle have been satisfactorily performed; and sending an electronic disapproval message responsive to determining the repair procedures for the damaged vehicle have not been satisfactorily performed.

Embodiments of the system may include one or more of the following features. In some embodiments, the method further comprises dividing the extracted repair procedure data into a plurality of portions; determining at least one technician device for each of the portions of the extracted repair procedure data; and transmitting each of the portions of the extracted repair procedure data to the corresponding technician device. In some embodiments, the method further comprises determining technical configuration data associated with each technician device; modifying each of the portions of the extracted repair procedure data according to the technical configuration data determined to be associated with the corresponding technician device; and transmitting each modified portion of the extracted repair procedure data to the corresponding technician device. In some embodiments, determining whether the repair procedures for the damaged vehicle have been satisfactorily performed comprises: determining whether the repair log data satisfies one or more benchmarks associated with the extracted repair procedure data. In some embodiments, determining whether the repair procedures for the damaged vehicle have been satisfactorily performed comprises: correlating the repair log data with the extracted repair procedure data, wherein both the repair log data and the extracted repair procedure data comprise at least one of images, videos, or text. In some embodiments, the method further comprises transmitting the repair log data to a quality assurance device, wherein a user determines whether the repair procedures for the damaged vehicle have been satisfactorily performed. In some embodiments, the method further comprises determining technical configuration data associated with the quality assurance device; modifying the received repair log data according to the technical configuration data determined to be associated with the quality assurance device; and transmitting the modified received repair log data to the quality assurance device.

In general, one aspect disclosed features a non-transitory machine-readable storage medium encoded with instructions executable by a hardware processor of a computing component, the machine-readable storage medium comprising instructions to cause the hardware processor to perform a method comprising: obtaining repair estimate data, wherein the repair estimate data describes a repair estimate for a damaged vehicle; extracting repair procedure data from an original equipment manufacturer (OEM) repair procedure database according to the received repair estimate data, wherein the extracted repair procedure data describes repair procedures for the damaged vehicle; transmitting the extracted repair procedure data to at least one technician computing device; obtaining repair log data generated by the at least one technician computing device, wherein the repair log data describes one or more repairs performed upon the damaged vehicle; determining whether the repair procedures for the damaged vehicle have been satisfactorily performed based on the received repair log data and the extracted repair procedure data; sending an electronic approval message responsive to determining the repair procedures for the damaged vehicle have been satisfactorily performed; and sending an electronic disapproval message responsive to determining the repair procedures for the damaged vehicle have not been satisfactorily performed.

Embodiments of the non-transitory machine-readable storage medium may include one or more of the following features. In some embodiments, the method further comprises dividing the extracted repair procedure data into a plurality of portions; determining at least one technician device for each of the portions of the extracted repair procedure data; and transmitting each of the portions of the extracted repair procedure data to the corresponding technician device. In some embodiments, the method further comprises determining technical configuration data associated with each technician device; modifying each of the portions of the extracted repair procedure data according to the technical configuration data determined to be associated with the corresponding technician device; and transmitting each modified portion of the extracted repair procedure data to the corresponding technician device. In some embodiments, determining whether the repair procedures for the damaged vehicle have been satisfactorily performed comprises: determining whether the repair log data satisfies one or more benchmarks associated with the extracted repair procedure data. In some embodiments, determining whether the repair procedures for the damaged vehicle have been satisfactorily performed comprises: correlating the repair log data with the extracted repair procedure data, wherein both the repair log data and the extracted repair procedure data comprise at least one of images, videos, or text. In some embodiments, the method further comprises transmitting the repair log data to a quality assurance device, wherein a user determines whether the repair procedures for the damaged vehicle have been satisfactorily performed. In some embodiments, the method further comprises determining technical configuration data associated with the quality assurance device; modifying the received repair log data according to the technical configuration data determined to be associated with the quality assurance device; and transmitting the modified received repair log data to the quality assurance device.

In general, one aspect disclosed features a computer-implemented method comprising: obtaining repair estimate data, wherein the repair estimate data describes a repair estimate for a damaged vehicle; extracting repair procedure data from an original equipment manufacturer (OEM) repair procedure database according to the received repair estimate data, wherein the extracted repair procedure data describes repair procedures for the damaged vehicle; transmitting the extracted repair procedure data to at least one technician computing device; obtaining repair log data generated by the at least one technician computing device, wherein the repair log data describes one or more repairs performed upon the damaged vehicle; determining whether the repair procedures for the damaged vehicle have been satisfactorily performed based on the received repair log data and the extracted repair procedure data; sending an electronic approval message responsive to determining the repair procedures for the damaged vehicle have been satisfactorily performed; and sending an electronic disapproval message responsive to determining the repair procedures for the damaged vehicle have not been satisfactorily performed.

Embodiments of the computer-implemented method may include one or more of the following features. Some embodiments comprise dividing the extracted repair procedure data into a plurality of portions; determining at least one technician device for each of the portions of the extracted repair procedure data; and transmitting each of the portions of the extracted repair procedure data to the corresponding technician device. Some embodiments comprise determining technical configuration data associated with each technician device; modifying each of the portions of the extracted repair procedure data according to the technical configuration data determined to be associated with the corresponding technician device; and transmitting each modified portion of the extracted repair procedure data to the corresponding technician device. In some embodiments, determining whether the repair procedures for the damaged vehicle have been satisfactorily performed comprises: determining whether the repair log data satisfies one or more benchmarks associated with the extracted repair procedure data. In some embodiments, determining whether the repair procedures for the damaged vehicle have been satisfactorily performed comprises: correlating the repair log data with the extracted repair procedure data, wherein both the repair log data and the extracted repair procedure data comprise at least one of images, videos, or text. Some embodiments comprise transmitting the repair log data to a quality assurance device, wherein a user determines whether the repair procedures for the damaged vehicle have been satisfactorily performed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
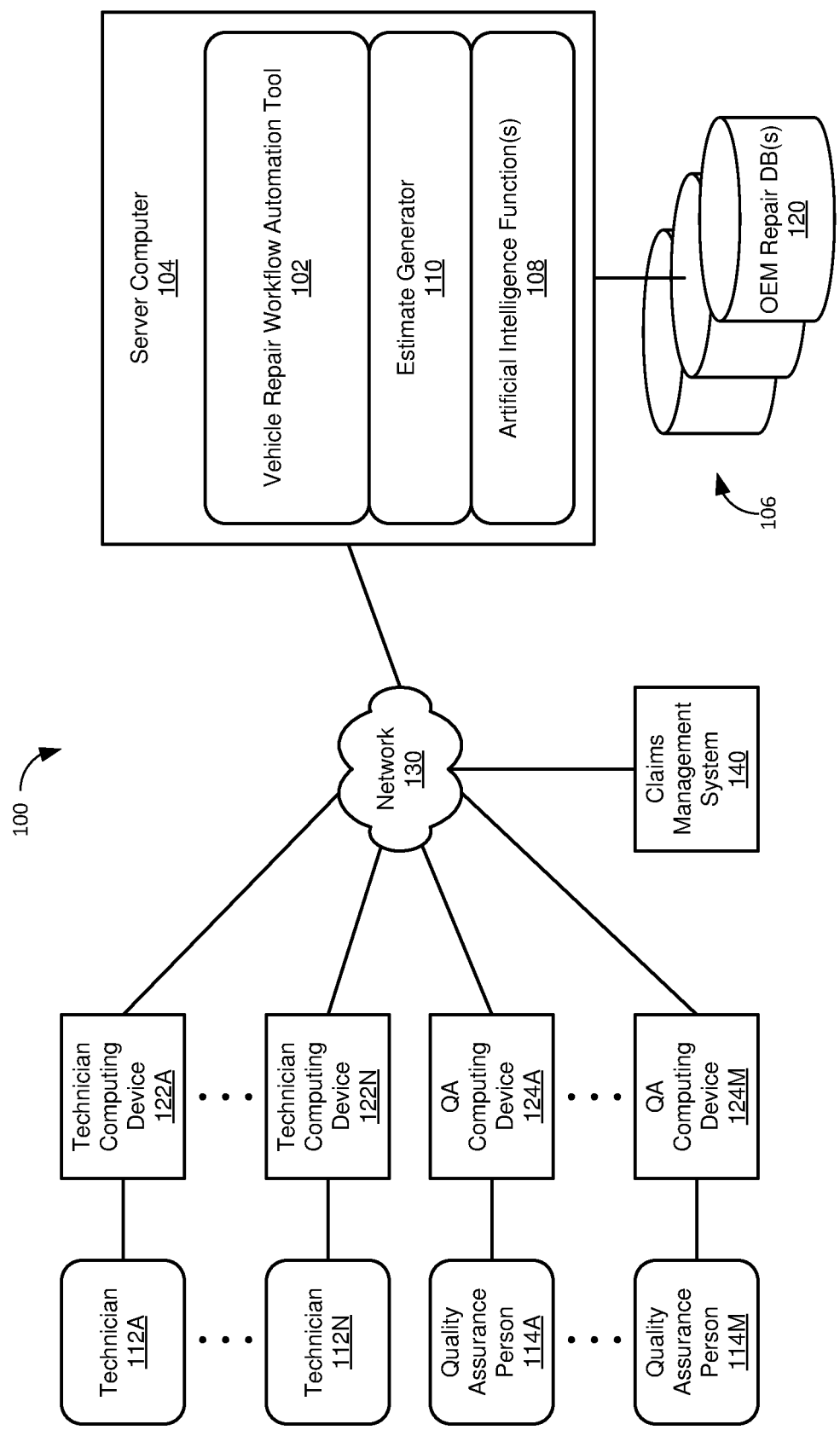
FIG. 1 illustrates a vehicle repair workflow automation system according to some embodiments of the disclosed technology.

The figures are not exhaustive and do not limit the present disclosure to the precise form disclosed.

DETAILED DESCRIPTION

With the advent of high-power, cost effective computing systems came the increased automation of numerous facets of our contemporary society. In the insurance and other casualty and loss industries, for example, computerized claims estimating, processing, tracking and payment systems have long been in use to streamline processes and to expedite claims handling and closure.

In the past several years vehicle complexity has increased dramatically. Each vehicle Original Equipment Manufacturer (OEM) has unique methods of vehicle construction that involve varying materials, substrates, joining technologies, and electronic systems. For example, the introduction of Advanced Driver Assistance Systems (ADAS) which include lane departure, automated braking systems, blind spot monitoring and others have improved collision avoidance. However, the wide variety of these systems and the methods to repair and recalibrate them have led to challenges for repairers. Virtually all OEMs, all of the major collision repair organizations (SCRS, ASA, and others), and even some state legislators have concluded that in order for vehicles to remain safe and to function as they did pre-collision, they must be repaired consistent with each OEM's published repair procedures. This presents three major challenges for collision repairers: obtaining access to the OEM repair procedures for all vehicles, obtaining access to the relevant repair procedures for a specific repair from the vast library of all OEM repair procedures (which can take 2 or more hours per repair), and verifying that repairs were completed consistent with the OEM repair procedures.

The result of these challenges is that many collision repairs are completed that are not consistent with OEM repair procedures due to the time and effort that is required to perform an OEM compliant repair. As consumers, insurance adjusters, and others cannot tell by observation of the completed repair that the repair was not performed consistent with OEM, this issue may not be uncovered during a traditional quality assurance process. The result is that many vehicle collision repairs are delivered where the vehicle has not been repaired consistent with OEM repair procedures and therefore has not fully been returned to pre-accident function. These vehicles may not protect the vehicle's occupants correctly in a subsequent collision event.

In this description, various embodiments are disclosed for vehicle repair workflow automation. However, embodiments of the disclosed technology apply to other processes as well. For example, embodiments may apply to generating estimates for medical procedures, and the like. These and other applications will be apparent to one skilled in the relevant art after reading this description. Before describing embodiments of the disclosed technology in detail, it is useful to describe an example environment in which the disclosed technology may be implemented.

FIG. 1 illustrates a vehicle repair workflow automation system 100 according to some embodiments of the disclosed technology. Multiple users may be involved in the vehicle repair workflow. For example, referring to FIG. 1, the users may include the one or more vehicle repair technicians 112A-N, one or more quality assurance (QA) persons 114A-M, and the like. Each of the vehicle repair technicians 112A-N may employ a respective technician computing device 122A-N. Each of the QA persons 114A-M may employ a respective QA computing device 124A-M. Each computing device may be implemented as a desktop computer, laptop computer, smart phone, smart glasses, embedded computers and displays, diagnostic devices and the like.

The system 100 may include a vehicle repair workflow automation tool 102, which may be implemented as one or more software packages executing on one or more server computers 104. Each technician 112 and QA person 114 may employ a respective computing device 122 or 124 to access the tool 102 over a network 130 such as the Internet.

The system 100 may include one or more artificial intelligence functions 108, which may include artificial intelligence technologies such as image analysis, text mining, deep analysis, and the like.

The system 100 may access one or more databases 106. The databases 106 may include one or more original equipment manufacturer (OEM) repair procedure databases 106. The OEM databases may store vehicle repair procedures, and the like. Other databases 106 may store completed estimates, estimates in process, data regarding parts, part costs, labor, labor costs, repair logs, and the like.

The system 100 may include an estimate generator 110, which may be implemented as one or more software packages executing on one or more of the server computers 104. The estimate generator 110 may generate vehicle repair estimates.

The system 100 may include a claims management system 140. The claims management system 140 may be operated, for example, by a vehicle insurer.

Figure 2:
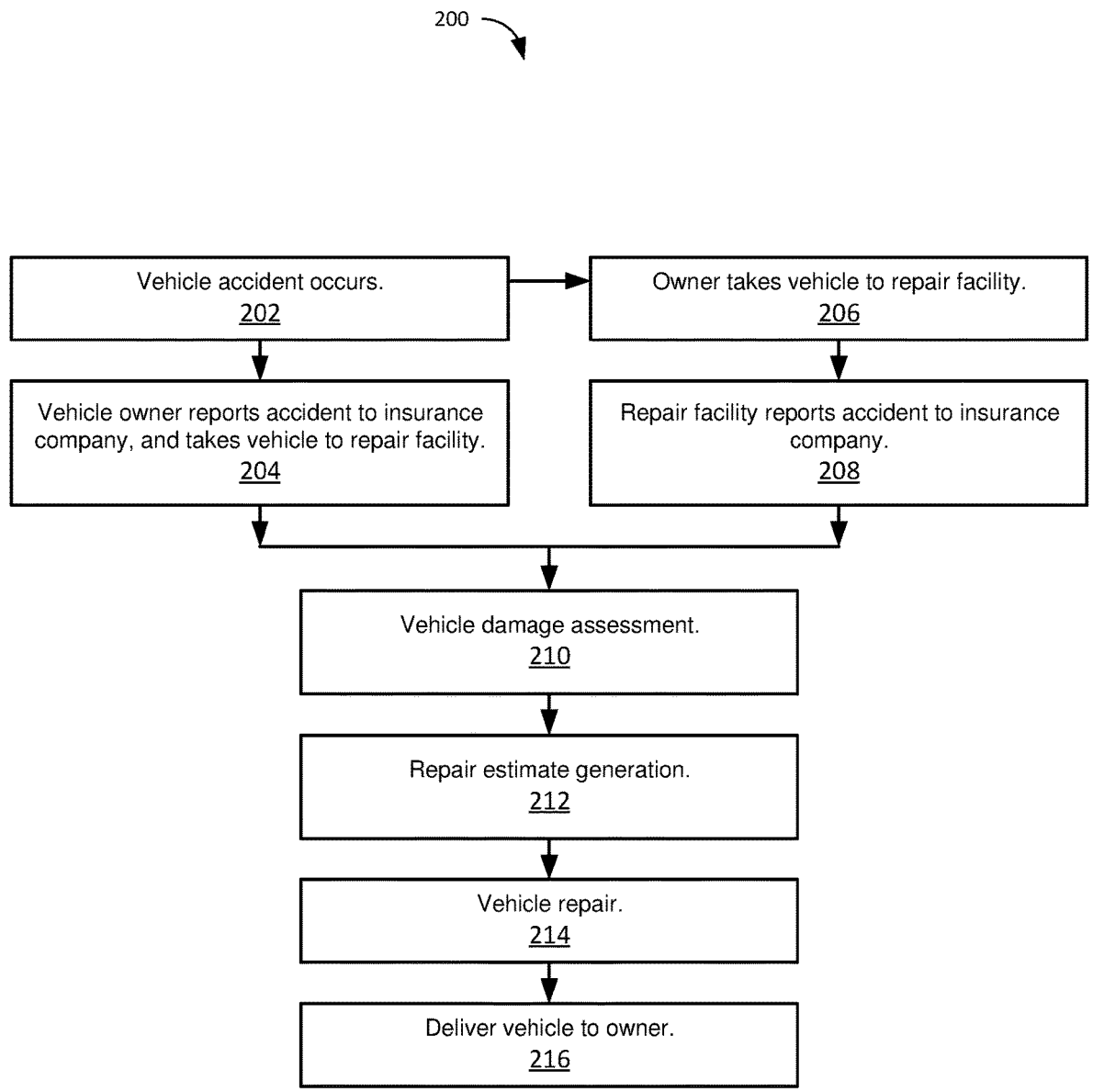
FIG. 2 illustrates a process for vehicle repair workflow according to some embodiments of the disclosed technology.

FIG. 2 illustrates a process 200 for vehicle repair workflow according to some embodiments of the disclosed technology. The elements of the disclosed processes are presented in a particular order. However, it should be understood that, in various embodiments, one or more elements may be performed in a different order, in parallel, or omitted. Referring to FIG. 2, the process 200 may begin with a vehicle accident, at 202, and may continue with the vehicle owner reporting the accident to an insurance company, and taking the vehicle to a repair facility, at 204. Alternatively, the owner may take the vehicle to a repair facility, at 206, which may report the accident to the insurance company, at 208.

Next, a vehicle damage assessment is performed, at 210. For example, a staff appraiser of an insurance company may visit the damaged vehicle to take photos of the damage. Alternatively, the owner may send photos of the damaged vehicle to the insurance company. Next, the process may include the generation of a vehicle repair estimate, at 212. Based on the vehicle repair estimate, the repair of the vehicle may take place, at 214, as described below in detail. When the repair is complete, the repaired vehicle may be delivered to the vehicle owner, at 216.

Figure 3:
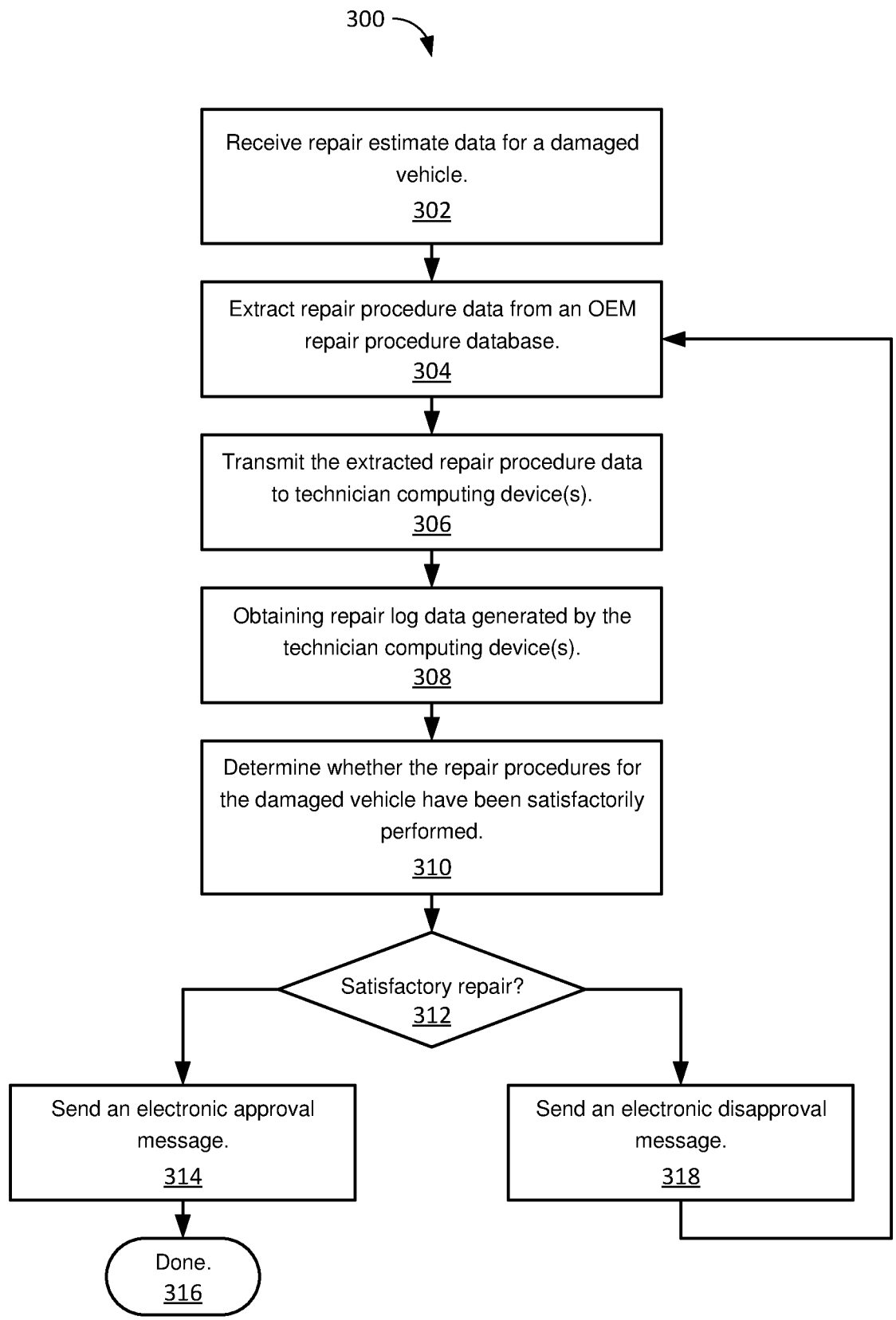
FIG. 3 illustrates a vehicle repair workflow automation process according to some embodiments of the disclosed technology.

FIG. 3 illustrates a vehicle repair workflow automation process 300 according to some embodiments of the disclosed technology. The process 300 may be performed, for example, by the vehicle repair estimating system 100 of FIG. 1. Referring to FIG. 3, the process 300 may include obtaining repair estimate data for a damaged vehicle, at 302. In some embodiments, the repair estimate data may be received from an external entity. In the example of FIG. 1, the repair estimate data may be obtained by the vehicle repair workflow automation tool 102 from the claims management system 140. In some embodiments, the repair estimate data may be generated locally. In the example of FIG. 1, the repair estimate data may be generated by the estimate generator 110, and provided to the vehicle repair workflow automation tool 102. In some embodiments, the repair estimate data may be a combination of data received from an external entity and data generated locally.

The repair estimate data may describe a repair estimate for a damaged vehicle. The repair estimate may include one or more lines. Each line may include a description of a vehicle repair operation, an estimated cost of the recommended vehicle repair operation, labor hours, part prices, labor rates, operation codes, and the like.

Referring again to FIG. 3, the process 300 may include extracting repair procedure data from an OEM repair procedure database, at 304. In the example of FIG. 1, the vehicle repair workflow automation tool 102 may extract the repair procedure data from the OEM repair procedure databases 106. The extracted repair procedure data may describe repair procedures for the damaged vehicle. For example, the repair procedure data may include text, images, videos, and the like.

The repair procedure data may be extracted according to the received repair estimate data. For example, the repair estimate data may identify the manufacturer of the vehicle. In this example, the vehicle repair workflow automation tool 102 may use the identity of the manufacturer of the vehicle to select the OEM repair procedure database 106 for that manufacturer. Other repair estimate data that may be used to extract the repair procedure data may include vehicle make, model, year, damaged components, and the like.

Referring again to FIG. 3, the process 300 may include transmitting the extracted repair procedure data to one or more technician computing devices, at 306. In the example of FIG. 1, the vehicle repair workflow automation tool 102 may transmit the repair procedure data to one or more of the technician computing devices 122.

The vehicle repair workflow automation tool 102 may select the technician computing devices 122 according to predetermined criteria. The tool 102 may select the technician computing devices 122 according to expertise or certifications possessed by the corresponding technicians 112. For example, when the vehicle damage includes damage to the frame of the vehicle, the tool 102 may select devices 122 associated with technicians having expertise or certifications in vehicle frame repair. Similar selections may be based upon particular damaged components, systems, and the like.

In some embodiments, the vehicle repair workflow automation tool 102 may divide the extracted repair procedure data into a plurality of portions. For example, when a vehicle has damage to the frame, a body component, and the electrical system, the tool 102 may divide the repair procedure data into those three portions. The tool 102 may then determine at least one technician computing device 122 for each of the portions of the extracted repair procedure data. For example, the tool 102 may then select one or more technicians for each portion of the repair procedure data.

Continuing the example, the tool 102 may select one or more frame technicians, one or more body technicians, and one or more electrical technicians.

The vehicle repair workflow automation tool 102 may then transmit each of the portions of the extracted repair procedure data to the corresponding technician computing device 122. Different technician computing devices 122 may have different technical configurations. The tool 102 may determine technical configuration data associated with each technician computing device 122. The technical configuration data may include data regarding screen size, screen resolution, type of processor, memory capacity, and the like. The tool 102 may modify each of the portions of the extracted repair procedure data according to the technical configuration data determined to be associated with the corresponding technician computing device 122. The tool 102 may then transmit each modified portion of the extracted repair procedure data to the corresponding technician computing device 122. For example, the tool 102 may resize the dimensions of the image data within the repair procedure data depending on the screen size and resolution.

The technicians use the repair procedure data to repair the vehicle. During and/or after the repair, the technicians 112 may capture log data documenting the vehicle repair. The repair log data may describe one or more repairs performed upon the damaged vehicle. The technicians 112 may the capture log data using the technician computing devices 122. The log data may include images, videos, textual data, and the like. In some embodiments, the log data may include data regarding time spent on reviewing the repair procedure data, performing the corresponding repair procedure, and the like.

Referring to FIG. 3, the process 300 may include obtaining repair log data generated by the technician computing device(s), at 308. Referring again to FIG. 1, in some embodiments, the vehicle repair workflow automation tool 102 may receive the repair log data from the technician computing devices 122. In some embodiments, the technician computing devices 122 may store the repair log data in the databases 106, and the tool 102 may obtain the repair log data from the databases 106.

Referring to FIG. 3, the process 300 may include determining whether the repair procedures for the damaged vehicle have been satisfactorily performed, at 310. In the example of FIG. 1, this determination may be made by the vehicle repair workflow automation tool 102. This determination may be based on analysis of the received repair log data and the extracted repair procedure data. This determination may be accomplished using one or more artificial intelligence functions 108, which may include artificial intelligence technologies such as image analysis, text mining, deep analysis, and the like.

In some embodiments, this determination may be made by correlating the received repair log data with the extracted repair procedure data. Both the received repair log data and the extracted repair procedure data may include images, videos, and/or text. Correlating the repair log data with the extracted repair procedure data may include comparison and analysis of the images, videos, and/or text.

In some embodiments, this determination may be made by determining whether the repair log data satisfies one or more benchmarks associated with the extracted repair procedure data. For example, this determination may include determining whether the content of the images, videos, and/or textual data in the repair log data matches the content of images, videos, and/or textual data in the extracted repair procedure data within certain stored thresholds and/or ranges.

In some embodiments, this determination may be made by one or more users, for example such as quality assurance personnel. Referring to FIG. 1, in such embodiments, the vehicle repair workflow automation tool 102 may transmit the repair log data to one or more of the quality assurance computing devices 124 for one or more of the quality assurance persons 114 to determine whether the repair procedures for the damaged vehicle have been satisfactorily performed. This determination may include consideration of the extracted repair procedure data as well. In some embodiments, the tool 102 may transmit the extracted repair procedure data to the quality assurance computing devices 124 as well.

Different quality assurance computing devices 124 may have different technical configurations. The tool 102 may determine technical configuration data associated with each quality assurance computing device 124. The technical configuration data may include data regarding screen size, screen resolution, type of processor, memory capacity, and the like. The tool 102 may modify the repair log data and/or the extracted repair procedure data according to the technical configuration data determined to be associated with the corresponding quality assurance computing device 124. The tool 102 may then transmit each modified data to the corresponding quality assurance computing device 124.

In some embodiments, the system may generate a quality assessment report indicating the repair procedure that is performed along with any corresponding images, videos, textual data, and/or the like. The quality assessment report may be generated by the vehicle repair workflow automation tool 102, quality assurance personnel 114, or a combination thereof. The quality assessment report may be stored in the repair log in the databases 106, provided to the claims management system 140, to other entities, and the like.

Referring again to FIG. 3, responsive to determining the repair procedures for the damaged vehicle have been satisfactorily performed, at 312, the process 300 may include sending an electronic approval message, at 314. Referring to FIG. 1, the vehicle repair workflow automation tool 102 may send the electronic approval message to a vehicle repair log stored in the databases 106. In some embodiments, the tool 102 may also send the electronic approval message to one or more entities, for example such as an insurer, one or more technicians 112, and the like. At this point the repair may be complete, at 316

Referring again to FIG. 3, responsive to determining the repair procedures for the damaged vehicle have not been satisfactorily performed, at 314, the process 300 may include sending an electronic disapproval message, at 318. Referring to FIG. 1, the vehicle repair workflow automation tool 102 may send the electronic disapproval message to a vehicle repair log stored in the databases 106. In some embodiments, the tool 102 may also send the electronic disapproval message to one or more entities, for example such as an insurer, one or more technicians 112, and the like. At this point the repair may not be complete, and the process 300 may repeat, for example with extracting repair procedure data from an OEM repair procedure database, at 304.

Embodiments of the disclosed technology confer numerous benefits. Significant time is saved (an average of 2 or more hours per repair) and operating expense for the repairer because the time required to research and access repair procedures is mostly eliminated. OEM repair procedure information is made easily available to all participants in the repair process including estimators, technicians performing the repairs, and quality assurance personnel. Embodiments may provide documentation of all repair procedure page views, date/time stamped by user, so that a permanent record is produced that shows repair procedures were utilized in each individual repair, in the repair log. Embodiments may provide a method to perform a post-repair quality assurance check that both validates that repairs were completed consistent with OEM repair procedures, and also provides documentation of the OEM compliance for each individual repair, in the quality assurance report.

Figure 4:
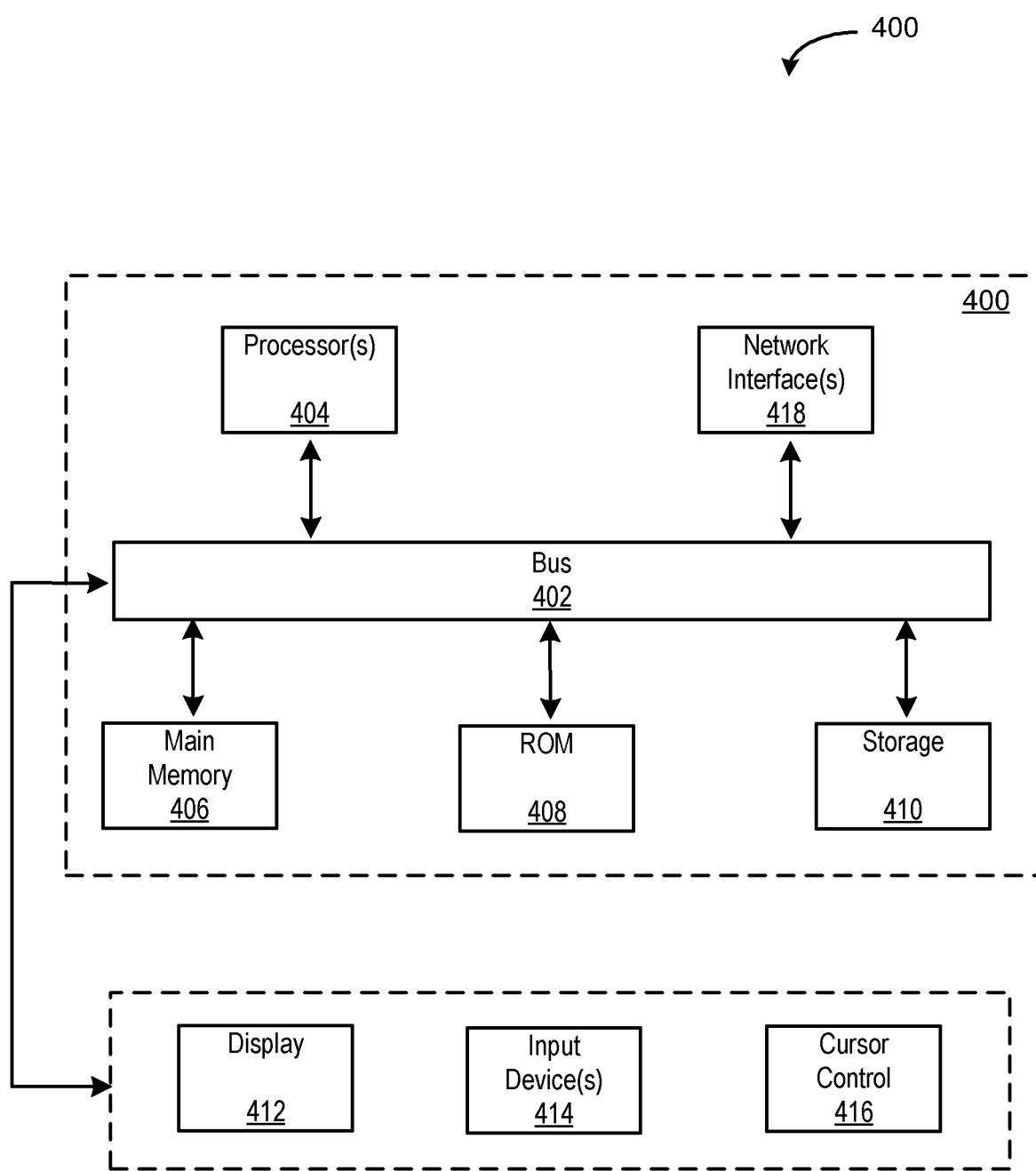
FIG. 4 is an example computing component that may be used to implement various features of embodiments described in the present disclosure.

FIG. 4 depicts a block diagram of an example computer system 400 in which embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C, C++, and Python. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or a WAN component to communicate with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
    a hardware processor; and
    a non-transitory machine-readable storage medium encoded with instructions executable by the hardware processor to perform a method comprising:
        obtaining repair estimate data, wherein the repair estimate data describes a repair estimate for a damaged vehicle;
        extracting repair procedure data from an original equipment manufacturer (OEM) repair procedure database according to the received repair estimate data, wherein the extracted repair procedure data describes repair procedures for the damaged vehicle, and wherein the repair procedure data includes one or more first text descriptions of required repair operations and/or one or more first images;
        transmitting the extracted repair procedure data to at least one technician computing device;
        obtaining repair log data generated by the at least one technician computing device, wherein the repair log data describes one or more repairs performed upon the damaged vehicle, and wherein the repair log data includes one or more second text descriptions of completed repair operations and/or one or more second images;
        determining whether the repair procedures for the damaged vehicle have been performed based on the obtained repair log data and the extracted repair procedure data using one or more artificial intelligence functions by at least one of:
            (i) comparing the one or more first text descriptions of required repair operations with the one or more second text descriptions of completed repair operations, and determining whether content of the one or more first text descriptions matches content of the one or more second text descriptions; or (ii) comparing the one or more first images with the one or more second images, and determining whether content of the one or more first images matches content of the one or more second images within certain stored thresholds and/or ranges;

sending an electronic approval message responsive to determining the repair procedures for the damaged vehicle have been performed;

sending an electronic disapproval message responsive to determining the repair procedures for the damaged vehicle have not been performed;

dividing the extracted repair procedure data into a plurality of portions;

determining at least one technician device for each of the portions of the extracted repair procedure data;

transmitting each of the portions of the extracted repair procedure data to the corresponding technician device;

determining technical configuration data associated with each technician device;

modifying each of the portions of the extracted repair procedure data according to the technical configuration data determined to be associated with the corresponding technician device; and transmitting each modified portion of the extracted repair procedure data to the corresponding technician device.

2. The system of claim 1, wherein determining whether the repair procedures for the damaged vehicle have been performed comprises:

determining whether the repair log data satisfies one or more benchmarks associated with the extracted repair procedure data.

3. The system of claim 1, wherein determining whether the repair procedures for the damaged vehicle have been performed comprises:

correlating the repair log data with the extracted repair procedure data, wherein both the repair log data and the extracted repair procedure data comprise at least one of images, videos, or text.

4. The system of claim 1, the method further comprising:

transmitting the repair log data to a quality assurance device, wherein a user determines whether the repair procedures for the damaged vehicle have been performed.

5. The system of claim 4, the method further comprising:

determining technical configuration data associated with the quality assurance device;

modifying the received repair log data according to the technical configuration data determined to be associated with the quality assurance device; and transmitting the modified received repair log data to the quality assurance device.

6. A non-transitory machine-readable storage medium encoded with instructions executable by a hardware processor of a computing component, the machine-readable storage medium comprising instructions to cause the hardware processor to perform a method comprising:

obtaining repair estimate data, wherein the repair estimate data describes a repair estimate for a damaged vehicle;

extracting repair procedure data from an original equipment manufacturer (OEM) repair procedure database according to the received repair estimate data, wherein the extracted repair procedure data describes repair procedures for the damaged vehicle, and wherein the repair procedure data includes one or more first text descriptions of required repair operations and/or one or more first images;

transmitting the extracted repair procedure data to at least one technician computing device;

obtaining repair log data generated by the at least one technician computing device, wherein the repair log data describes one or more repairs performed upon the damaged vehicle, and wherein the repair log data includes one or more second text descriptions of completed repair operations and/or one or more second images;

determining whether the repair procedures for the damaged vehicle have been performed based on the obtained repair log data and the extracted repair procedure data using one or more artificial intelligence functions by at least one of:

(i) comparing the one or more first text descriptions of required repair operations with the one or more second text descriptions of completed repair operations, and determining whether content of the one or more first text descriptions matches content of the one or more second text descriptions; or (ii) comparing the one or more first images with the one or more second images, and determining whether content of the one or more first images matches content of the one or more second images within certain stored thresholds and/or ranges;

sending an electronic approval message responsive to determining the repair procedures for the damaged vehicle have been performed;

sending an electronic disapproval message responsive to determining the repair procedures for the damaged vehicle have not been performed;

dividing the extracted repair procedure data into a plurality of portions;

determining at least one technician device for each of the portions of the extracted repair procedure data;

transmitting each of the portions of the extracted repair procedure data to the corresponding technician device;

determining technical configuration data associated with each technician device;

modifying each of the portions of the extracted repair procedure data according to the technical configuration data determined to be associated with the corresponding technician device; and transmitting each modified portion of the extracted repair procedure data to the corresponding technician device.

7. The non-transitory machine-readable storage medium of claim 6, wherein determining whether the repair procedures for the damaged vehicle have been performed comprises:

determining whether the repair log data satisfies one or more benchmarks associated with the extracted repair procedure data.

8. The non-transitory machine-readable storage medium of claim 6, wherein determining whether the repair procedures for the damaged vehicle have been performed comprises:

correlating the repair log data with the extracted repair procedure data, wherein both the repair log data and the extracted repair procedure data comprise at least one of images, videos, or text.

9. The non-transitory machine-readable storage medium of claim 6, the method further comprising:
  transmitting the repair log data to a quality assurance device, wherein a user determines whether the repair procedures for the damaged vehicle have been performed.

10. The non-transitory machine-readable storage medium of claim 9, the method further comprising:
  determining technical configuration data associated with the quality assurance device;
  modifying the received repair log data according to the technical configuration data determined to be associated with the quality assurance device; and
  transmitting the modified received repair log data to the quality assurance device.

11. A computer-implemented method comprising:
  obtaining repair estimate data, wherein the repair estimate data describes a repair estimate for a damaged vehicle;
  extracting repair procedure data from an original equipment manufacturer (OEM) repair procedure database according to the received repair estimate data, wherein the extracted repair procedure data describes repair procedures for the damaged vehicle, and wherein the repair procedure data includes one or more first text descriptions of required repair operations and/or one or more first images;
  transmitting the extracted repair procedure data to at least one technician computing device;
  obtaining repair log data generated by the at least one technician computing device, wherein the repair log data describes one or more repairs performed upon the damaged vehicle, and wherein the repair log data includes one or more second text descriptions of completed repair operations and/or one or more second images;
  determining whether the repair procedures for the damaged vehicle have been performed based on the obtained repair log data and the extracted repair procedure data using one or more artificial intelligence functions by at least one of:
    (i) comparing the one or more first text descriptions of required repair operations with the one or more second text descriptions of completed repair operations, and determining whether content of the one or more first text descriptions matches content of the one or more second text descriptions; or
    (ii) comparing the one or more first images with the one or more second images, and determining whether content of the one or more first images matches content of the one or more second images within certain stored thresholds and/or ranges;
  sending an electronic approval message responsive to determining the repair procedures for the damaged vehicle have been performed;
  sending an electronic disapproval message responsive to determining the repair procedures for the damaged vehicle have not been performed;
  dividing the extracted repair procedure data into a plurality of portions;
  determining at least one technician device for each of the portions of the extracted repair procedure data;
  transmitting each of the portions of the extracted repair procedure data to the corresponding technician device;
  determining technical configuration data associated with each technician device;
  modifying each of the portions of the extracted repair procedure data according to the technical configuration data determined to be associated with the corresponding technician device; and
  transmitting each modified portion of the extracted repair procedure data to the corresponding technician device.

12. The computer-implemented method of claim 11, wherein determining whether the repair procedures for the damaged vehicle have been performed comprises:
  determining whether the repair log data satisfies one or more benchmarks associated with the extracted repair procedure data.

13. The computer-implemented method of claim 11, wherein determining whether the repair procedures for the damaged vehicle have been performed comprises:
  correlating the repair log data with the extracted repair procedure data, wherein both the repair log data and the extracted repair procedure data comprise at least one of images, videos, or text.

14. The computer-implemented method of claim 11, the method further comprising:
  transmitting the repair log data to a quality assurance device, wherein a user determines whether the repair procedures for the damaged vehicle have been performed.

15. The computer-implemented method of claim 11, the method further comprising:
  determining technical configuration data associated with the quality assurance device;
  modifying the received repair log data according to the technical configuration data determined to be associated with the quality assurance device; and
  transmitting the modified received repair log data to the quality assurance device.

16. A system, comprising:
  a hardware processor; and
  a non-transitory machine-readable storage medium encoded with instructions executable by the hardware processor to perform a method comprising:
    obtaining repair estimate data, wherein the repair estimate data describes a repair estimate for a damaged vehicle;
    extracting repair procedure data from an original equipment manufacturer (OEM) repair procedure database according to the received repair estimate data, wherein the extracted repair procedure data describes repair procedures for the damaged vehicle, and wherein the repair procedure data includes one or more first text descriptions of required repair operations and/or one or more first images;
    transmitting the extracted repair procedure data to at least one technician computing device;
    obtaining repair log data generated by the at least one technician computing device, wherein the repair log data describes one or more repairs performed upon the damaged vehicle, and wherein the repair log data includes one or more second text descriptions of completed repair operations and/or one or more second images;
    determining whether the repair procedures for the damaged vehicle have been performed based on the obtained repair log data and the extracted repair procedure data using one or more artificial intelligence functions by at least one of:
      (i) comparing the one or more first text descriptions of required repair operations with the one or more second text descriptions of completed repair operations, and determining whether content of the one or more first text descriptions matches content of the one or more second text descriptions; or
    (ii) comparing the one or more first images with the one or more second images, and determining whether content of the one or more first images matches content of the one or more second images within certain stored thresholds and/or ranges;
sending an electronic approval message responsive to determining the repair procedures for the damaged vehicle have been performed;
sending an electronic disapproval message responsive to determining the repair procedures for the damaged vehicle have not been performed;
transmitting the repair log data to a quality assurance device, wherein a user determines whether the repair procedures for the damaged vehicle have been performed;
determining technical configuration data associated with the quality assurance device;
modifying the received repair log data according to the technical configuration data determined to be associated with the quality assurance device; and
transmitting the modified received repair log data to the quality assurance device.

17. The system of claim 16, the method further comprising:
dividing the extracted repair procedure data into a plurality of portions;
determining at least one technician device for each of the portions of the extracted repair procedure data; and
transmitting each of the portions of the extracted repair procedure data to the corresponding technician device.

18. The system of claim 16, wherein determining whether the repair procedures for the damaged vehicle have been performed comprises:
determining whether the repair log data satisfies one or more benchmarks associated with the extracted repair procedure data.

19. The system of claim 16, wherein determining whether the repair procedures for the damaged vehicle have been performed comprises:
correlating the repair log data with the extracted repair procedure data, wherein both the repair log data and the extracted repair procedure data comprise at least one of images, videos, or text.

20. A non-transitory machine-readable storage medium encoded with instructions executable by a hardware processor of a computing component, the machine-readable storage medium comprising instructions to cause the hardware processor to perform a method comprising:
obtaining repair estimate data, wherein the repair estimate data describes a repair estimate for a damaged vehicle;
extracting repair procedure data from an original equipment manufacturer (OEM) repair procedure database according to the received repair estimate data, wherein the extracted repair procedure data describes repair procedures for the damaged vehicle, and wherein the repair procedure data includes one or more first text descriptions of required repair operations and/or one or more first images;
transmitting the extracted repair procedure data to at least one technician computing device;
obtaining repair log data generated by the at least one technician computing device, wherein the repair log data describes one or more repairs performed upon the damaged vehicle, and wherein the repair log data includes one or more second text descriptions of completed repair operations and/or one or more second images;
determining whether the repair procedures for the damaged vehicle have been performed based on the obtained repair log data and the extracted repair procedure data using one or more artificial intelligence functions by at least one of:
    (i) comparing the one or more first text descriptions of required repair operations with the one or more second text descriptions of completed repair operations, and determining whether content of the one or more first text descriptions matches content of the one or more second text descriptions; or
    (ii) comparing the one or more first images with the one or more second images, and determining whether content of the one or more first images matches content of the one or more second images within certain stored thresholds and/or ranges;
sending an electronic approval message responsive to determining the repair procedures for the damaged vehicle have been performed;
sending an electronic disapproval message responsive to determining the repair procedures for the damaged vehicle have not been performed;
transmitting the repair log data to a quality assurance device, wherein a user determines whether the repair procedures for the damaged vehicle have been performed;
determining technical configuration data associated with the quality assurance device;
modifying the received repair log data according to the technical configuration data determined to be associated with the quality assurance device; and
transmitting the modified received repair log data to the quality assurance device.

21. The non-transitory machine-readable storage medium of claim 20, the method further comprising:
dividing the extracted repair procedure data into a plurality of portions;
determining at least one technician device for each of the portions of the extracted repair procedure data; and
transmitting each of the portions of the extracted repair procedure data to the corresponding technician device.

22. The non-transitory machine-readable storage medium of claim 20, wherein determining whether the repair procedures for the damaged vehicle have been performed comprises:
determining whether the repair log data satisfies one or more benchmarks associated with the extracted repair procedure data.

23. The non-transitory machine-readable storage medium of claim 20, wherein determining whether the repair procedures for the damaged vehicle have been performed comprises:
correlating the repair log data with the extracted repair procedure data, wherein both the repair log data and the extracted repair procedure data comprise at least one of images, videos, or text.

24. A computer-implemented method comprising:
obtaining repair estimate data, wherein the repair estimate data describes a repair estimate for a damaged vehicle;
extracting repair procedure data from an original equipment manufacturer (OEM) repair procedure database according to the received repair estimate data, wherein the extracted repair procedure data describes repair procedures for the damaged vehicle, and wherein the repair procedure data includes one or more first text descriptions of required repair operations and/or one or more first images;

transmitting the extracted repair procedure data to at least one technician computing device;

obtaining repair log data generated by the at least one technician computing device, wherein the repair log data describes one or more repairs performed upon the damaged vehicle, and wherein the repair log data includes one or more second text descriptions of completed repair operations and/or one or more second images;

determining whether the repair procedures for the damaged vehicle have been performed based on the obtained repair log data and the extracted repair procedure data using one or more artificial intelligence functions by at least one of:

(i) comparing the one or more first text descriptions of required repair operations with the one or more second text descriptions of completed repair operations, and determining whether content of the one or more first text descriptions matches content of the one or more second text descriptions; or (ii) comparing the one or more first images with the one or more second images, and determining whether content of the one or more first images matches content of the one or more second images within certain stored thresholds and/or ranges;

sending an electronic approval message responsive to determining the repair procedures for the damaged vehicle have been performed;

sending an electronic disapproval message responsive to determining the repair procedures for the damaged vehicle have not been performed;

transmitting the repair log data to a quality assurance device, wherein a user determines whether the repair procedures for the damaged vehicle have been performed;

determining technical configuration data associated with the quality assurance device;

modifying the received repair log data according to the technical configuration data determined to be associated with the quality assurance device; and transmitting the modified received repair log data to the quality assurance device.

25. The computer-implemented method of claim 24, the method further comprising:

dividing the extracted repair procedure data into a plurality of portions;

determining at least one technician device for each of the portions of the extracted repair procedure data; and transmitting each of the portions of the extracted repair procedure data to the corresponding technician device.

26. The computer-implemented method of claim 24, wherein determining whether the repair procedures for the damaged vehicle have been performed comprises:

determining whether the repair log data satisfies one or more benchmarks associated with the extracted repair procedure data.

27. The computer-implemented method of claim 24, wherein determining whether the repair procedures for the damaged vehicle have been performed comprises:

correlating the repair log data with the extracted repair procedure data, wherein both the repair log data and the extracted repair procedure data comprise at least one of images, videos, or text.

* * * * *